United States Patent
Ikeda et al.

(10) Patent No.: US 8,570,300 B2
(45) Date of Patent: Oct. 29, 2013

(54) TOUCH DETECTION FUNCTION DISPLAY DEVICE AND ELECTRONIC APPARATUS

(75) Inventors: Masanobu Ikeda, Aichi (JP); Koji Ishizaki, Tokyo (JP); Koji Noguchi, Kanagawa (JP); Takayuki Nakanishi, Kanagawa (JP)

(73) Assignee: Japan Display West, Inc., Aichi-Ken (JP)

( * ) Notice: Subject to any disclaimer, the term of this patent is extended or adjusted under 35 U.S.C. 154(b) by 179 days.

(21) Appl. No.: 13/137,019

(22) Filed: Jul. 15, 2011

(65) Prior Publication Data

US 2012/0075237 A1    Mar. 29, 2012

(30) Foreign Application Priority Data

Sep. 24, 2010   (JP) ................................ 2010-214189

(51) Int. Cl.
*G06F 3/045*     (2006.01)

(52) U.S. Cl.
USPC .......................................................... 345/174

(58) Field of Classification Search
None
See application file for complete search history.

(56) References Cited

U.S. PATENT DOCUMENTS

| 2010/0182273 A1 | 7/2010 | Noguchi et al. |
| 2010/0220071 A1* | 9/2010 | Nishihara et al. ............. 345/173 |
| 2010/0289770 A1* | 11/2010 | Lee et al. ...................... 345/174 |

FOREIGN PATENT DOCUMENTS

| JP | 03-051822 | 3/1991 |
| JP | 06-265941 | 9/1994 |
| JP | 10-223943 | 8/1998 |
| JP | 2009-244958 | 10/2009 |
| WO | WO 2009119664 A1 * | 10/2009 |

* cited by examiner

*Primary Examiner* — Nicholas Lee
(74) *Attorney, Agent, or Firm* — Rader, Fishman & Grauer PLLC

(57) ABSTRACT

A touch detection function display device includes a first substrate, a second substrate that includes a plurality of touch detection electrodes provided in parallel and a terminal portion formed along one substrate side and connected to each of the plurality of touch detection electrodes, a display function layer that is interposed between the first substrate and the second substrate, a seal portion that is provided to surround the display function layer to seal the display function layer between the first substrate and the second substrate and a shield electrode that is provided on the first substrate, the second substrate, or both substrates along the substrate side on which the terminal portion is provided. The shield electrode includes an electrode pattern portion that is selectively formed between the first substrate, the second substrate, or both substrates, and the seal portion.

17 Claims, 16 Drawing Sheets

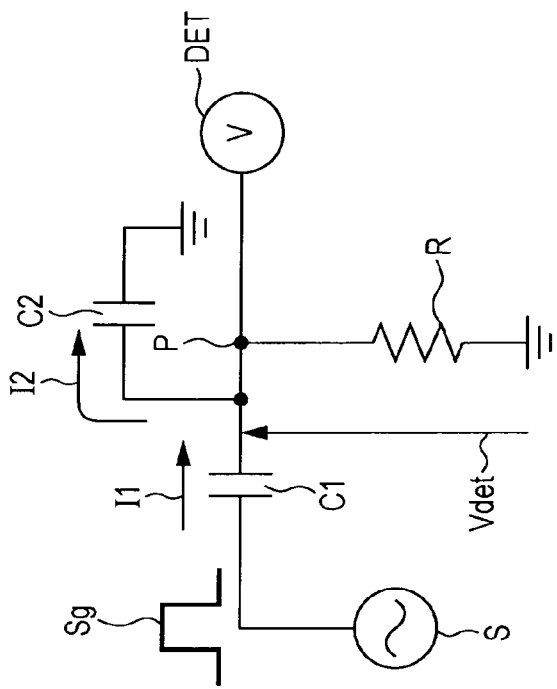
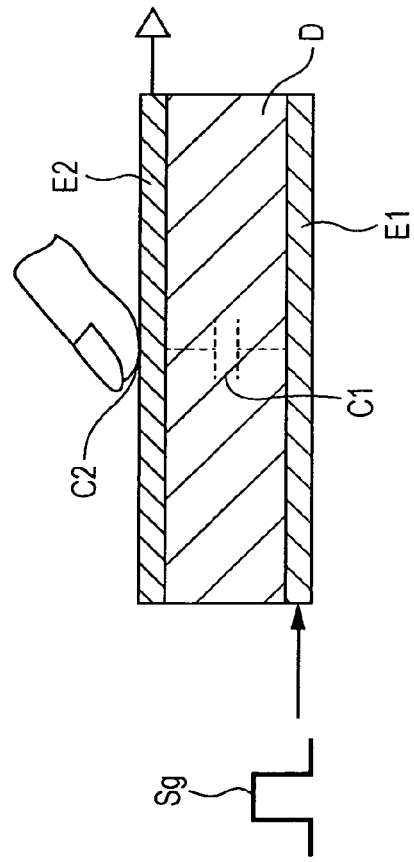
FIG. 2B
FIG. 2A

FIG. 3A
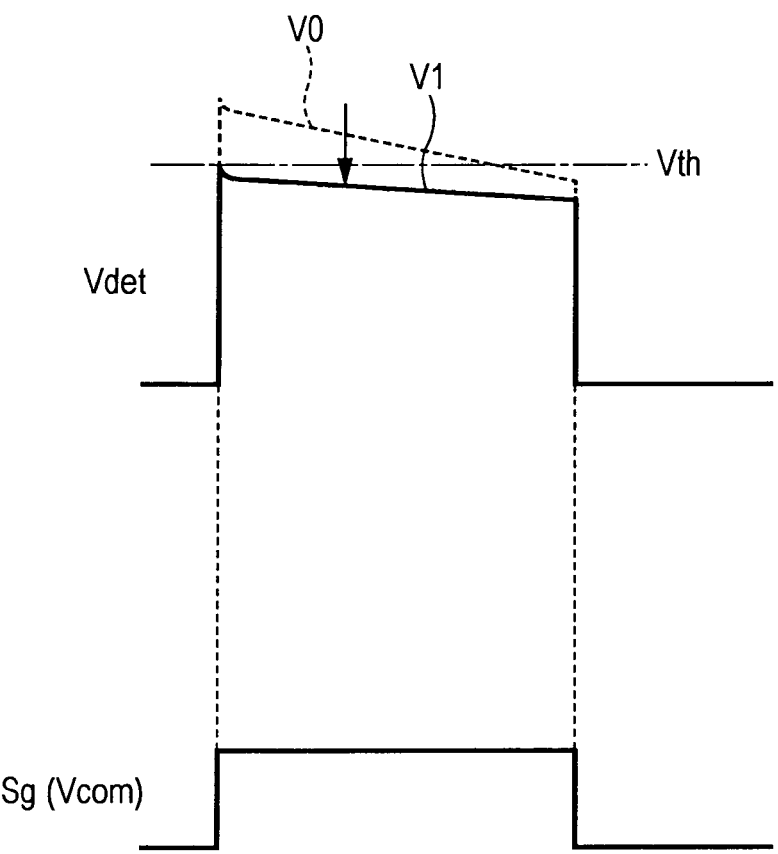
FIG. 3B Sg (Vcom)

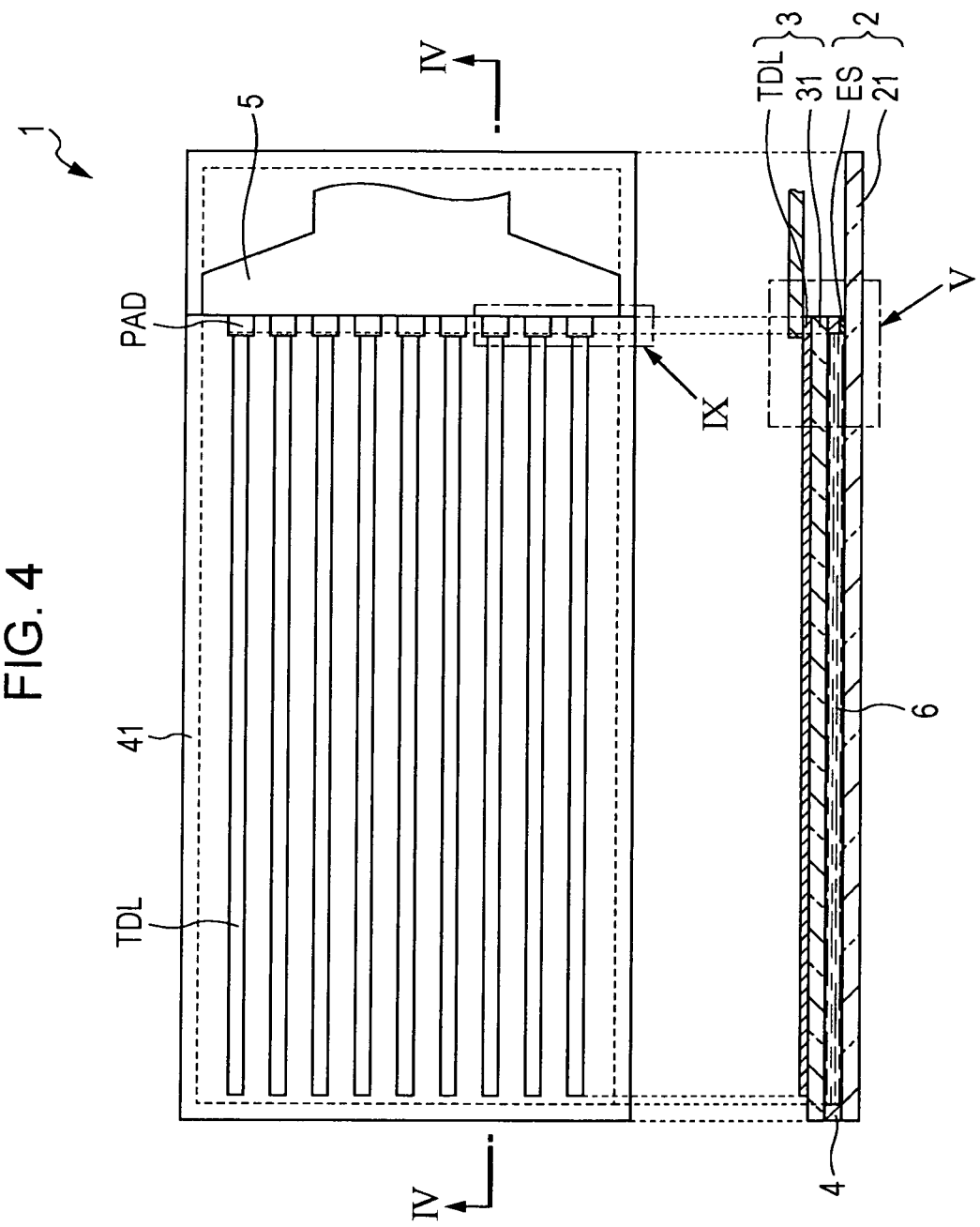

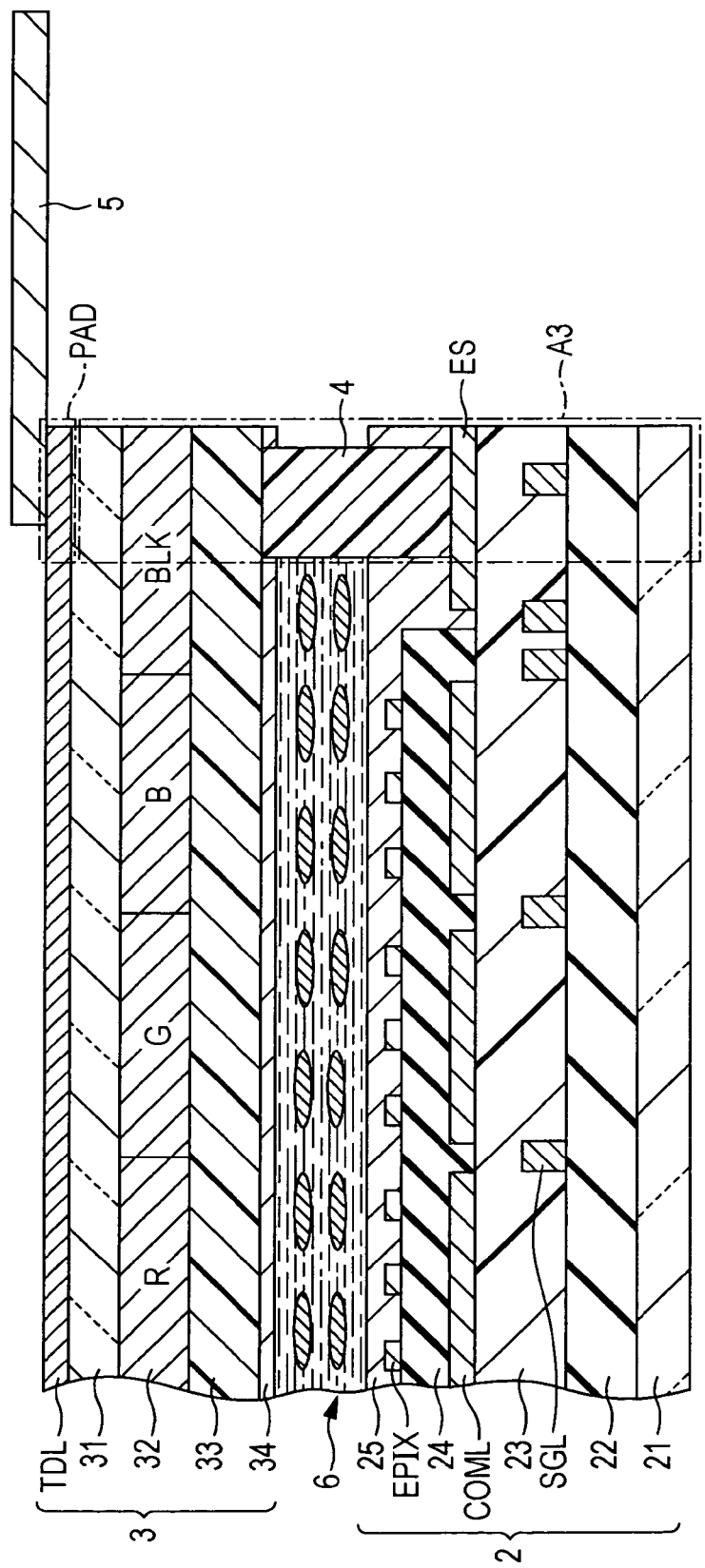

|  |  | YOUNG'S MODULUS (GPa) | THERMAL EXPANSION COEFFICIENT (ppm/k) |
|---|---|---|---|
| OPPOSED SUBSTRATE 3 | GLASS SUBSTRATE 31 | 77 | 3.8 |
| | GLASS FILTER 32 (BLK) | 5.0 | 60 |
| | PLANARIZED FILM 33 | 5.0 | 60 |
| SEAL 4 | | 3.0 | 60 |
| PIXEL SUBSTRATE 2 | SHIELD ELECTRODE ES | 3.0 | 7.2 |
| | PLANARIZED FILM 23 | 5.6 | 230 |
| | INSULATING FILM 22 | 95 | 1.0 |
| | TFT SUBSTRATE 21 | 77 | 3.8 |

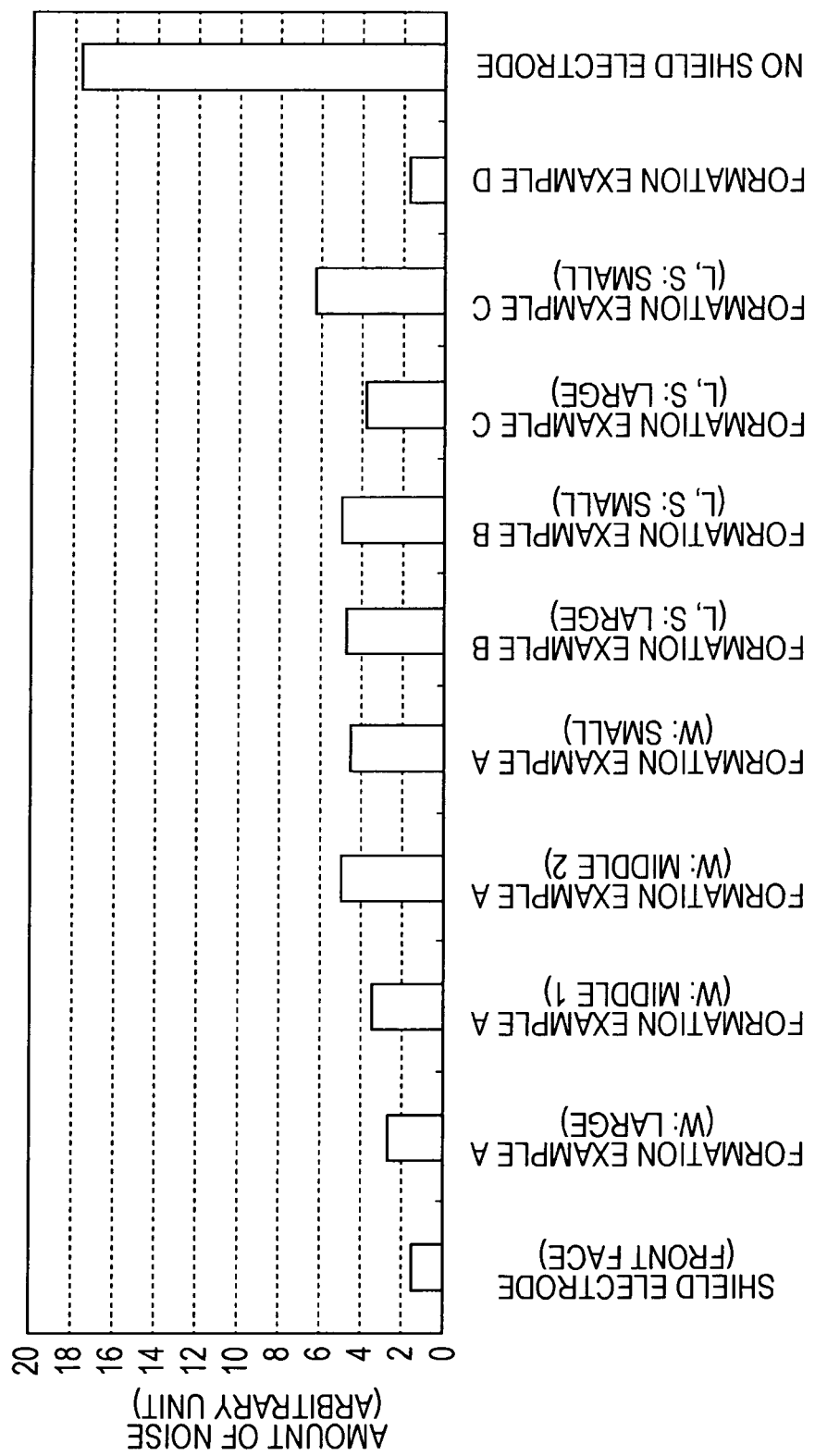

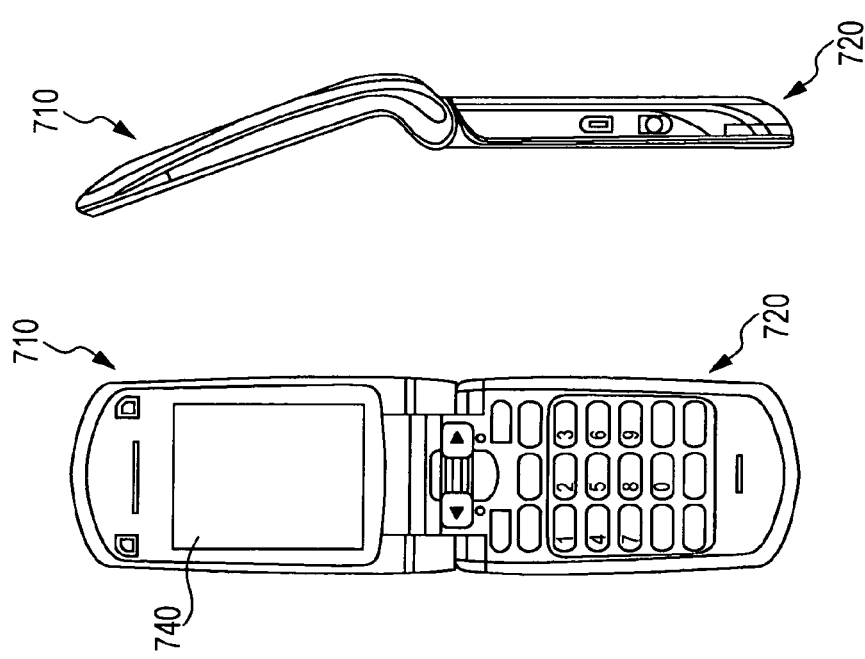
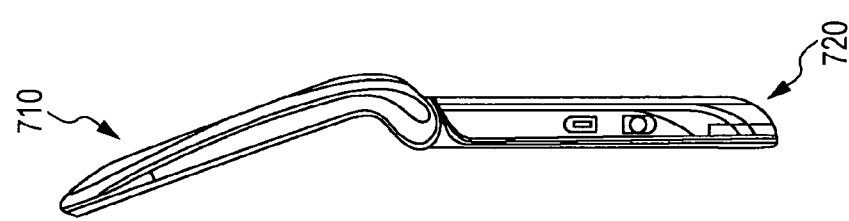
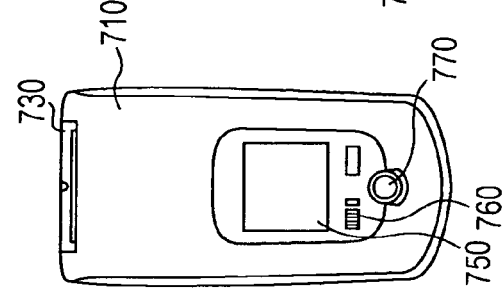
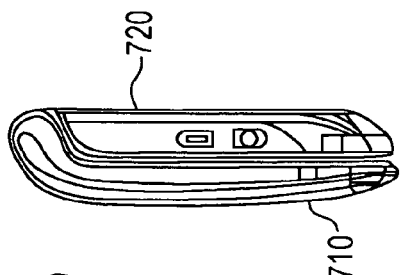
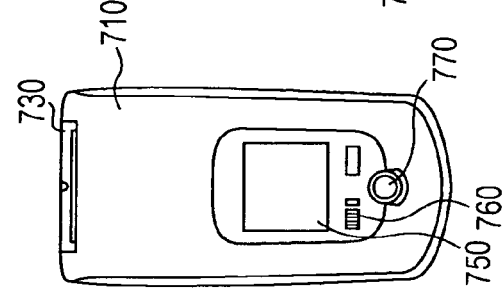
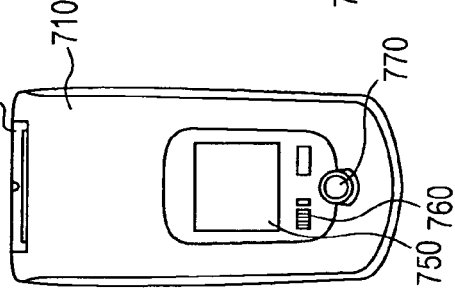

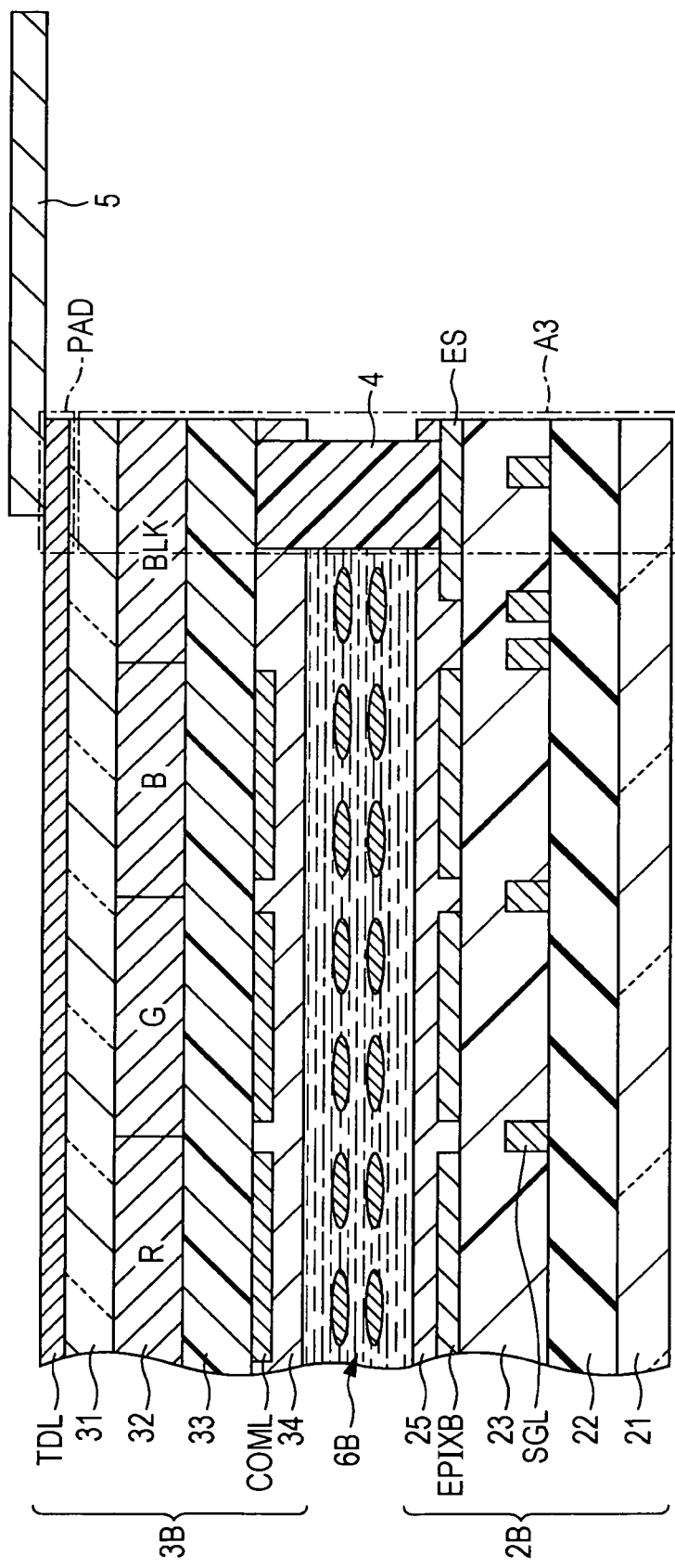

TOUCH DETECTION FUNCTION DISPLAY DEVICE AND ELECTRONIC APPARATUS

BACKGROUND

The present disclosure relates to a display device having a touch detection function, and more particularly, a touch detection function display device that detects a touch on the basis of change of electrostatic capacitance caused by an external close object, and an electronic apparatus including the touch detection function display device.

Recently, a display device such as a liquid crystal display device has had a touch detection function of detecting an external close object such as a finger, various button images are displayed on the display device to input information instead of general mechanical buttons, and such a display device is attracting attention. In the display device having the touch detection function, an input device such as a keyboard, a mouse, and a keypad is not necessary, and the display device may be widely used as a mobile information terminal such as a mobile phone in addition to a computer.

As a type of a touch detection device, there are several types such as an optical type and a resistance type, but an electrostatic capacitance type touch detection device having a relatively simple structure and realizing low power consumption is expected. For example, Japanese Unexamined Patent Application Publication No. 2009-244958 discloses a display device having a touch detection function and including a pixel substrate that is provided with a pixel electrode and a common electrode to perform displaying, an opposed substrate that is provided with a touch detection electrode, and a liquid crystal layer that serves as a display function layer provided between the pixel substrate and the opposed substrate. In the display device, the display common electrode is also used as one of a pair of touch sensor electrodes, the other electrode (touch detection electrode) is provided to intersect with the common electrode, and the touch is detected using the change of electrostatic capacitance of the intersection part according to whether or not there is the external close object.

However, in the production process, various studies have been made regarding a method of increasing the close adhesion between layers formed of materials different from each other. For example, Japanese Unexamined Patent Application Publication No. 10-223943 and Japanese Unexamined Patent Application Publication No. 6-265941 disclose a liquid crystal display device in which a layer for raising the close adhesion is interposed between two layers in a non-linear element used in the liquid crystal display device. Japanese Unexamined Patent Application Publication No. 3-51822 discloses a non-linear element to improve the close adhesion between a layer and resin by performing a sputter etching process on the surface of metal.

SUMMARY

However, the touch detection device may be affected by a display operation of the display device. Specifically, for example, when the liquid crystal display device and the touch detection device are integrally formed, a signal in the display device may be transmitted to the touch detection electrode in the touch detection device. In this case, an S/N ratio of the touch detection signal may deteriorate, and precision in touch position may deteriorate. However, in Japanese Unexamined Patent Application Publication No. 2009-244958, there is no description about the influence of the display operation on the touch detection.

Generally, it is preferable that an electronic apparatus has resistance against stress. For example, in a liquid crystal display device, it is necessary to make liquid crystal not to leak even when the stress is applied. However, in Japanese Unexamined Patent Application Publication No. 2009-244958, there is no description about stress resistance. Japanese Unexamined Patent Application Publication No. 10-223943, Japanese Unexamined Patent Application Publication No. 6-265941, and Japanese Unexamined Patent Application Publication No. 3-51822 relate to the non-linear element, and there is no description about the leaking of liquid crystal.

It is preferable to provide a touch detection function display device securing stress resistance and being capable of performing touch detection while reducing an influence of a display operation, and an electronic apparatus.

A touch detection function display device of an embodiment of the present disclosure includes a first substrate, a second substrate, a display function layer, a seal portion, and a shield electrode. The second substrate includes a plurality of touch detection electrodes provided in parallel and a terminal portion formed along one substrate side and connected to each of the plurality of touch detection electrodes. The display function layer is interposed between the first substrate and the second substrate. The seal portion is provided to surround the display function layer to seal the display function layer between the first substrate and the second substrate. The shield electrode is provided on the first substrate, the second substrate, or both substrates along the substrate side on which the terminal portion is provided. The shield electrode includes an electrode pattern portion that is selectively formed between the first substrate, the second substrate, or both substrates, and the seal portion.

An electronic apparatus according to another embodiment of the present disclosure includes the touch detection function display device, and corresponds to, for example, a television, a digital camera, a personal computer, a video camera, or a mobile terminal such as a mobile phone.

In the touch detection function display device and the electronic apparatus of the embodiment of the present disclosure, displaying is performed on the display function layer, and a touch detection signal is output from the touch detection electrode of the second substrate to perform touch detection. In this case, at the electrode pattern portion of the shield electrode, a signal for the display operation on the first substrate is shielded. The first substrate, the second substrate, or both substrates, and the seal portion come in close contact with a part where the electrode pattern is not formed.

In the touch detection function display device of the embodiment of the present disclosure, for example, a liquid crystal layer may be applied as the display function layer. In this case, for example, it is preferable that a plurality of pixel electrodes is formed on the side of the first substrate opposed to the second substrate, and the plurality of touch detection electrodes and the terminal portion are formed on the opposite side to the side of the second substrate opposed to the first substrate. For example, it is preferable that the plurality of touch detection electrodes extend in a direction intersecting with the substrate side on which the terminal portion is provided, and a plurality of common electrodes extending in a direction intersecting with the plurality of touch detection electrodes is provided on the opposed face of the first substrate or the second substrate to the opposite substrate. For example, it is preferable that the shield electrode is formed at a part other than parts corresponding to four corners of the first substrate and the second substrate.

The electrode pattern portion may be selectively formed, for example, as follows. For example, the electrode pattern portion may be selectively formed at a position corresponding to the terminal portion. For example, the electrode pattern portion may be selectively formed to cross the seal portion, and may be selectively formed to extend in a direction taken along the seal portion. For example, the first substrate may have a control signal line formed to pass through a position corresponding to the seal portion, and the electrode pattern portion may be selectively formed at a part corresponding to the control signal line. In this case, the touch detection function display device may further include a touch detection unit that detects a touch on the basis of the touch detection signal at a touch detection period, and the electrode pattern portion may be selectively formed at a part corresponding to the control signal line, a signal level of which is changed during the touch detection period.

An unevenness portion may be selectively formed on the surface of the first substrate, the second substrate, or both substrates, at a part where the electrode pattern portion is not formed between the first substrate, the second substrate, or both substrates, and the seal portion.

The shield electrode may be formed using the same layer as that of the other electrode, as follows. For example, the common electrodes may be formed on a layer other than the layer, on which the pixel electrodes are formed, on the face of the first substrate opposed to the second substrate, and the shield electrode may be formed on at least one side of the same layer as the layer on which the pixel electrodes are formed and the same layer as the layer on which the common electrodes are formed, on the first substrate. For example, the common electrodes may be formed on the face of the second substrate opposed to the first substrate, and the shield electrode may be formed on at least one side of the same layer as the layer on which the pixel electrodes are formed on the first substrate and the same layer as the layer on which the common electrodes are formed on the second substrate.

The shield electrode may be formed of, for example, at least one or more of ITO, IZO, zinc oxide, tin oxide, and TiO. For example, the shield electrode may be formed of a material with mechanical characteristics similar to those of base portions of the first substrate and the second substrate on which the shield electrode is formed and the seal portion. In this case, it is preferable that the mechanical characteristics include at least a Young's modulus. For example, the shield electrode, the base portion, and the seal portion may be formed of an organic material. In this case, the shield electrode may be formed of, for example, any of polythiophene, polyacetylene, polyaniline, and polypyrrole.

For example, the shield electrode may be also formed on the side intersecting with the substrate side. It is preferable that a fixed potential is applied to the shield electrode.

According to the touch detection function display device and the electronic apparatus of the embodiments of the present disclosure, since the shield electrode including the selectively formed electrode pattern portion is formed along the substrate side, it is possible to secure stress resistance and to perform the touch detection while reducing the influence of the display operation.

BRIEF DESCRIPTION OF THE DRAWINGS

FIG. 2A and FIG. 2B are diagrams illustrating a basic principle of a touch detection method in a touch detection function display device of the present disclosure, and are diagrams illustrating a state where a finger comes in contact or is close.

FIG. 3A and FIG. 3B are diagrams illustrating a basic principle of a touch detection method in a touch detection function display device of the present disclosure, and are diagrams illustrating an example of a waveform of a driving signal and a touch detection signal.

FIG. 4 is a plan view and a cross-sectional view illustrating an example of a configuration of the touch detection function display device according to an embodiment of the present disclosure.

FIG. 5 is a cross-sectional view illustrating a schematic cross-sectional structure of the touch detection function display device shown in FIG. 4.

FIG. 10 a plot diagram illustrating an amount of noise of the touch detection electrode shown in FIG. 4.

FIG. 16A to FIG. 16G are a front view, a side view, a top view, and a bottom view illustrating a configuration of appearance of application 5.

FIG. 18 is a cross-sectional view illustrating a schematic cross-sectional structure of still another touch detection function display device according to a modified example.

DETAILED DESCRIPTION OF EMBODIMENTS

Hereinafter, embodiments of the present disclosure will be described in detail with reference to the drawings. The description may be performed in the following order.

1. Basic Principle of Electrostatic Capacitance Type Touch Detection
2. Embodiment
3. Application 1. Basic Principle of Electrostatic Capacitance Type Touch Detection First, a basic principle of touch detection of a touch detection function display device of the present disclosure will be described with reference to FIG. 1A to FIG. 3B. The touch detection method is embodied as an electrostatic capacitance type touch sensor, for example, as shown in FIG. 1A, a capacitance element is formed using a pair of electrodes (driving electrode E1 and touch detection electrode E2) opposed to each other with a dielectric D interposed therebetween. This structure is represented by an equivalent circuit shown in FIG. 1B. The capacitance element C1 is formed by the driving electrode E1, the touch detection electrode E2, and the dielectric D. In the capacitance element C1, one end is connected to an alternating current signal source (driving signal source) S, and the other end P is connected to the ground through a resistor R and is connected to a voltage detector (touch detection circuit) DET. When an alternating current rectangular wave Sg (FIG. 3B) of a predetermined frequency (e.g., about several kHz to several tens of kHz) is applied from the alternating current signal source S to the driving electrode E1 (one end of the capacitance element C1), an output waveform (touch detection signal Vdet) shown in FIG. 3A is shown in the touch detection electrode E2 (the other end P of the capacitance element C1).

Figure 1B:
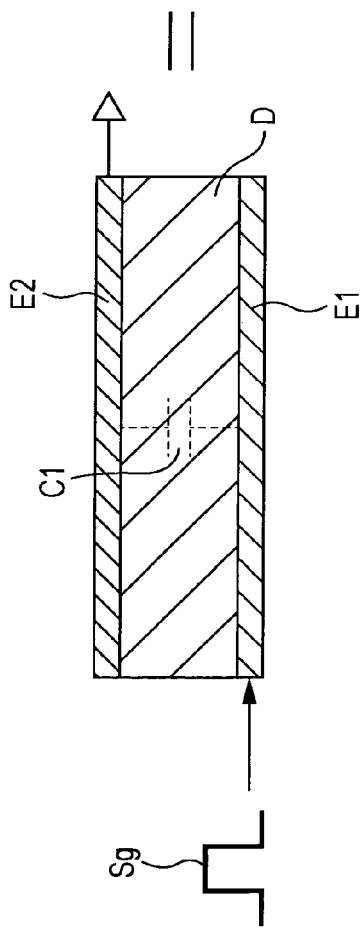
FIG. 1A and FIG. 1B are diagrams illustrating a basic principle of a touch detection method in a touch detection function display device of the present disclosure, and are diagrams illustrating a state where a finger does not come in contact or is not close.
Figure 1A:
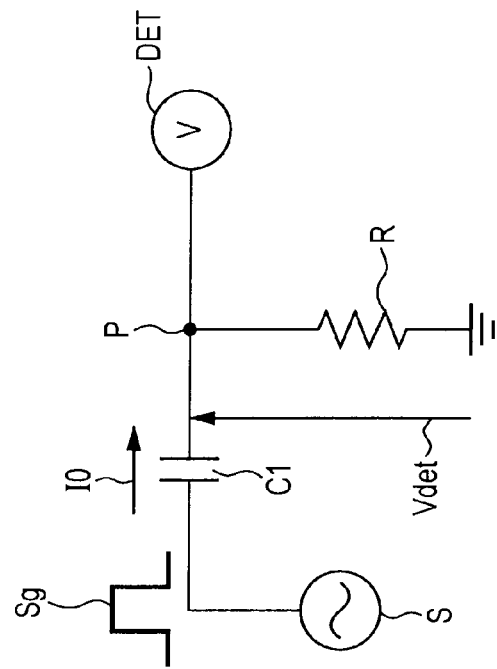

When a finger does not come in contact (or is not close), a current I0 corresponding to a capacitance value of the capacitance element C1 flows according to charge and discharge with respect to the capacitance element C1 as shown in FIG. 1B. In this case, a potential waveform of the other end P of the capacitance element C1 is, for example, a waveform V0 shown in FIG. 3A, and the waveform is detected by the voltage detector DET.

Meanwhile, when the finger comes in contact (or close), the capacitance element C2 formed by the finger is added to the capacitance element C1 in series as shown in FIG. 2A and FIG. 2B. In this state, currents I1 and I2 flow according to charge and discharge with respect to the capacitance elements C1 and C2, respectively. In this case, a potential waveform of the other end P of the capacitance element C1 is, for example, a waveform V1 shown in FIG. 3A; the waveform is detected by the voltage detector DET. In this case, a potential of a point P is a voltage division potential determined by the values of the currents I1 and I2 flowing in the capacitance elements C1 and C2. For this reason, the value of the waveform V1 is smaller than that of the waveform V0 of the non-contact state. The voltage detector DET compares the detected voltage with a predetermined threshold voltage Vth, determines that it is the non-contact state when the detected voltage is equal to or higher than the threshold voltage, and determines that it is the contact state when the detected voltage is lower than the threshold voltage. As described above, it is possible to perform the touch detection.

2. Embodiment

Example of Configuration

Example of Overall Configuration

FIG. 4 shows an example of a configuration of the touch detection function display device according to the embodiment of the present disclosure, and FIG. 5 shows an example of a cross-sectional structure of a main portion (portion V) of FIG. 4. The touch detection function display device uses a liquid crystal display element as a display element, and is a so-called in-cell-type device in which a liquid crystal display device formed by the liquid crystal display element and an electrostatic capacitance type touch detection device are integrated.

The touch detection function display device 1 includes a pixel substrate 2, an opposed substrate 3, an FPC 5, a liquid crystal layer 6, and a seal 4.

As shown in FIG. 5, the pixel substrate 2 includes a TFT substrate 21 as a circuit board, a common electrode COML, a pixel electrode EPIX, and a shield electrode ES. The TFT substrate 21 serves as a circuit board on which various electrodes and wires, a thin film transistor (TFT), and the like are formed. The TFT substrate 21 is formed of, for example, glass. An insulating film 22 is formed on the TFT substrate 21, and a signal line SGL is formed thereon. A planarized film 23 formed of, for example, acrylic organic resin, is formed on the signal line SGL, and the common electrode COML is formed thereon. The common electrode COML is an electrode for supplying common voltage to a plurality of pixels Pix (not shown), and has light transparency. The common electrode COML is used as an electrode applying an alternating current rectangular wave Sg to a touch sensor. That is, the common electrode COML corresponds to the driving electrode E1 in the basic principle of electrostatic capacitance type touch detection described above. An insulating film 24 is formed on the common electrode COML, and the pixel electrode EPIX is formed thereon. The pixel electrode EPIX is an electrode for supplying a pixel signal for display, and has light transparency. The common electrode COML and the pixel electrode EPIX are formed of, for example, ITO (Indium Tin Oxide). An alignment film 25 is formed on the pixel electrode EPIX.

The shield electrode ES is formed on the planarized film 23. As shown in FIG. 4, the shield electrode ES is selectively formed on the side on which the FPC 5 is provided, at an outer peripheral portion 41 of the pixel substrate 2 on which the seal 4 is formed. A fixed potential is applied to the shield electrode ES. The shield electrode 4 is formed at the same layer as the layer on which the common electrode COML is formed. That is, the shield electrode 4 is formed of ITO similarly to the common electrode COML. Accordingly, it is possible to form the shield electrode ES without adding a new production process.

As shown in FIG. 5, the opposed substrate 3 includes a glass substrate 31, a color filter 32, and a touch detection line TDL. The color filter 32 is formed on one face of the glass substrate 31. The color filter 32 is formed by periodically arranging 3 color filter layers of, for example, red (R), green (G), and blue (B) with a black matrix (BLK), and three colors of R, G, and B as one set correspond to each display pixel. A planarized film 33 formed of, for example, acrylic resin is formed on the color filter 32, and an alignment film 34 is formed thereon. The touch detection electrodes TDL are provided in parallel on the other face of the glass substrate 31 to extend in one direction. The touch detection electrode TDL is an electrode outputting the touch detection signal Vdet to the touch sensor. That is, the touch detection electrode TDL corresponds to the touch detection electrode E2 in the basic principle of electrostatic capacitance type touch detection described above. The touch detection electrode TDL is formed of, for example, ITO, and is an electrode having light transparency. As shown in FIG. 4, the touch detection electrode TDL is provided with terminal portions PAD, and is connected to the FPC 5 through the terminal portions PAD.

The FPC 5 is a flexible printed board for drawing out the touch detection signal Vdet of the touch detection electrode TDL. The FPC 5 is provided on one side of the opposed substrate 3, and is connected to the touch detection electrodes TDL through the terminal portions PAD. For example, the FPC 5 is connected to a touch detection circuit (not shown)

detecting whether or not there is a touch or detecting a touch position on the basis of the touch detection signal Vdet.

The liquid crystal layer 6 serves as a display function layer, and modulates light passing therethrough according to an electric field state. The electric field is formed by a potential difference between the voltage of the common electrode COML and the voltage of the pixel electrode EPIX. Liquid crystal of a lateral electric field mode such as FFS (fringe field switching) and IPS (in-plane switching) is used in the liquid crystal layer 6.

The seal 4 seals the liquid crystal layer 6 between the pixel substrate 2 and the opposed substrate 3. The seal 4 is formed of, for example, epoxy resin. The seal 4 is formed at the outer peripheral portion 41 of the pixel substrate 2 and the opposed substrate 3. That is, the seal 4 comes in close contact with the shield electrode ES at a part where the shield electrode ES is formed, and comes in close contact with the planarized film 23 at a part where the shield electrode ES is not formed.

With such a configuration, in the touch detection function display device 1, the shield electrode ES reduces a noise transmitted from the various electrodes and wires formed on the pixel substrate 2 and the thin film transistor to the terminal portion PAD of the touch detection electrode TDL through the seal 4. Since the shield electrode ES is selectively formed at the outer peripheral portion 41 of the pixel substrate 2, it is not easily peeled off when stress is applied to the touch detection function display device 1 to be described later.

Figure 6:
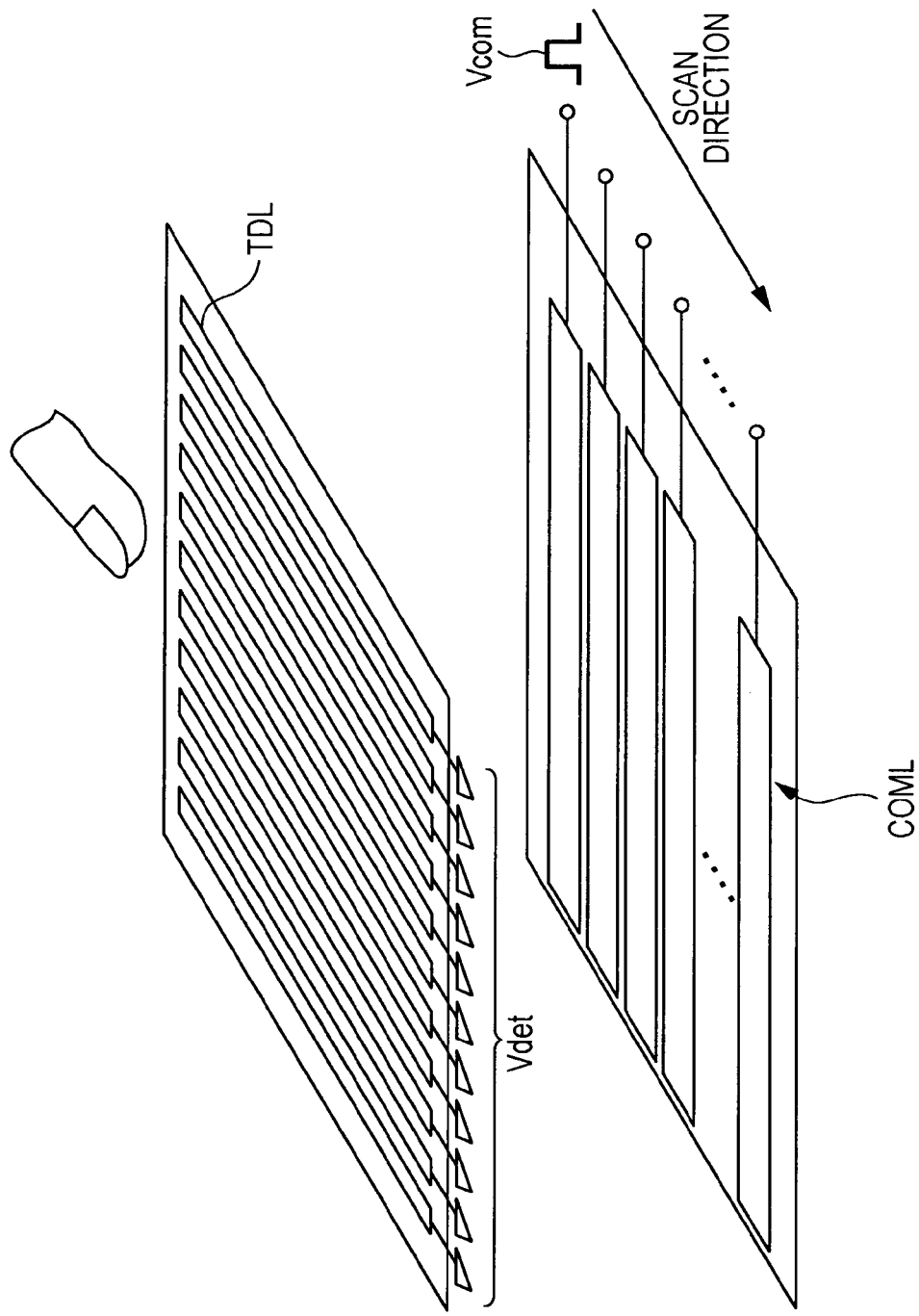
FIG. 6 is a perspective view illustrating an example of a configuration of a common electrode and a touch detection electrode of the touch detection function display device shown in FIG. 5.

FIG. 6 shows in perspective an example of a configuration of the touch sensor of the touch detection function display device 1. The touch sensor is formed of the common electrodes COML provided on the pixel substrate 2 and the touch detection electrodes TDL provided on the opposed substrate 3. The common electrodes COML are formed by a plurality of stripe-shaped electrode patterns extending in the left and right directions shown in FIG. 6. When the touch detection operation is performed, a driving signal Vcom (corresponds to the alternating current rectangular wave Sg in the basic principle of electrostatic capacitance type touch detection described above) is sequentially supplied to each electrode pattern, and time-sharing scanning driving is sequentially performed. The touch detection electrodes TDL are formed by electrode patterns extending in a direction intersecting with the extending direction of the electrode patterns of the common electrode COML. The electrode patterns intersecting with each other through the common electrodes COML and the touch detection electrodes TDL form electrostatic capacitance at the intersecting parts.

The touch sensor shown in FIG. 6 operates according to the basic principle of touch detection described above. That is, the common electrode COML corresponds to the driving electrode E1 in the basic principle of touch detection described above, and the touch detection electrode TDL corresponds to the touch detection electrode E2. As shown in FIG. 6, the electrode patterns intersecting with each other constitute electrostatic capacitance type touch sensor elements in a matrix. Accordingly, the scanning is performed over the whole of the touch detection face of the touch detection function display device 1, and thus it is possible to detect contact of the external close object or a position where the proximity occurs.

The pixel substrate 2 corresponds to a specific example of the "first substrate" of the present disclosure. The opposed substrate 3 corresponds to a specific example of the "second substrate" of the present disclosure. The seal 4 corresponds to a specific example of the "seal portion" of the present disclosure.

Operation and Effect

Subsequently, an operation and an effect of the touch detection function display device 1 of the embodiment will be described.

First, an overall operation outline of the touch detection function display device 1 will be described with reference to FIG. 4 to FIG. 6. In the display operation, the electric field is formed in the liquid crystal layer 6 on the basis of the signals supplied to the pixel electrodes EPIX and the common electrodes COML, and the direction of liquid crystal molecules of the liquid crystal layer 6 is changed, and the passing light is modulated, to perform the displaying. In the touch detection operation, the driving signals Vcom are sequentially supplied to the common electrodes COML, and the signals are transmitted to the touch detection electrodes TDL through the electrostatic capacitance between the common electrodes COML and the touch detection electrodes TDL and are output as the touch detection signals Vdet. The touch detection signals Vdet are supplied to the outside (e.g., the touch detection circuit) through the FPC 5, and are used to detect whether or not there is a touch or detect the touch position.

The display operation is performed by supplying signals to the pixel electrodes EPIX and the common electrodes COML provided on the pixel substrate 2. Accordingly, for example, when the signals are transmitted to the touch detection electrodes TDL of the opposed substrate 3 through the seal 4, an S/N ratio of the touch detection signal deteriorates, and precision in touch position may deteriorate. In the touch detection function display device 1, since the shield electrode ES is provided between the seal 4 and the pixel substrate 2 (planarized film 23), it is possible to suppress the noise. However, the close adhesion of the shield electrode ES to the planarized film 23 is not satisfactory; the liquid crystal may leak out of the liquid layer 6 due to peeling caused by stress. Hereinafter, the close adhesion between the shield electrode ES and the planarized film 23 will be described.

Figures 7, 8:
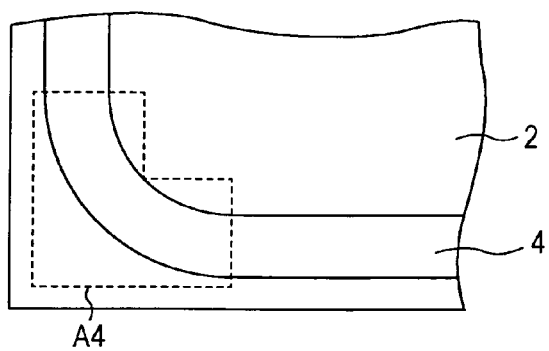
FIG. 7 is a table illustrating properties of layers of the touch detection function display device shown in FIG. 5.
FIG. 8 is a plan view illustrating a corner of the pixel substrate shown in FIG. 4.

FIG. 7 shows the Young's modulus and thermal expansion coefficient of each layer at the part where the seal 4 is formed (the part A3 of FIG. 5).

As shown in FIG. 7, the shield electrode ES and the planarized film 23 have greatly different Young's moduli from each other. In the ITO constituting the shield electrode ES and the acrylic organic resin constituting the planarized film 23, it is not easy to obtain strong close adhesion based on chemical bonding since generally indium and carbon do not generate a compound.

As shown in FIG. 7, the shield electrode ES and the planarized film 23 have greatly different thermal expansion coefficients from each other. Accordingly, when temperature is changed, the shield electrode ES and the planarized film 23 may be peeled off.

As described above, since the shield electrode ES and the planarized film 23 have different mechanical properties, the close adhesion is not satisfactory, and they may be peeled off by application of stress or change of temperature. For example, in FIG. 4, when the shield electrode ES is formed at all the outer peripheral portions 41 of the pixel substrate 2, the peeling occurs at about ⅓ stress strength as compared with a case where no shield electrode ES is formed. That is, this result means that the close adhesion between the shield electrode ES and the planarized film 23 is lower than the close adhesion between the seal 4 and the planarized film 23.

As described above, when the shield electrode ES is formed, it is possible to prevent the noise from being mixed into the touch detection electrodes TDL, but the stress resistance decreases. On the other hand, when the shield electrode ES is not formed, the stress resistance is improved, but the noise is mixed into the touch detection electrodes TDL, and the S/N ratio of the touch detection signal Vdet deteriorates.

In the touch detection function display device 1, the shield electrode ES is selectively formed at the outer peripheral portion 41 of the pixel substrate 2 as follows, to secure the stress resistance and suppressing the deterioration of the S/N ratio of the touch detection signal Vdet to be the minimum. Hereinafter, the formation of the shield electrode ES will be described.

FIG. 8 shows a corner of the pixel substrate 2. When the stress is applied to the touch detection function display device 1, the stress is generally concentrated at the corners of the pixel substrate 2. It is preferable that the shield electrode ES is not formed on the pixel substrate 2 in the area (e.g., part A4) in the vicinity of the corners of the pixel substrate 2. Accordingly, in the case of applying the stress, even when the stress is concentrated on the corners of the pixel substrate 2, it is possible to secure the stress resistance since the close adhesion between the seal 4 and the planarized film 23 is high.

Figure 9A:
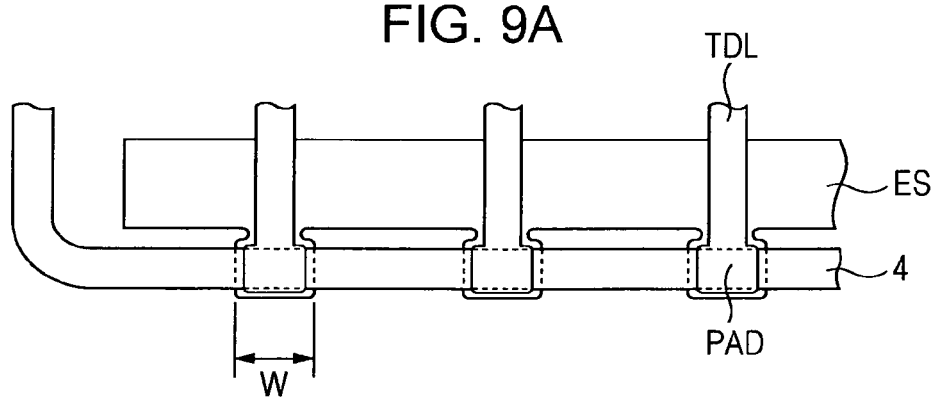
FIG. 9A to FIG. 9D are plan views illustrating examples of the shield electrode shown in FIG. 4.
Figure 9B:
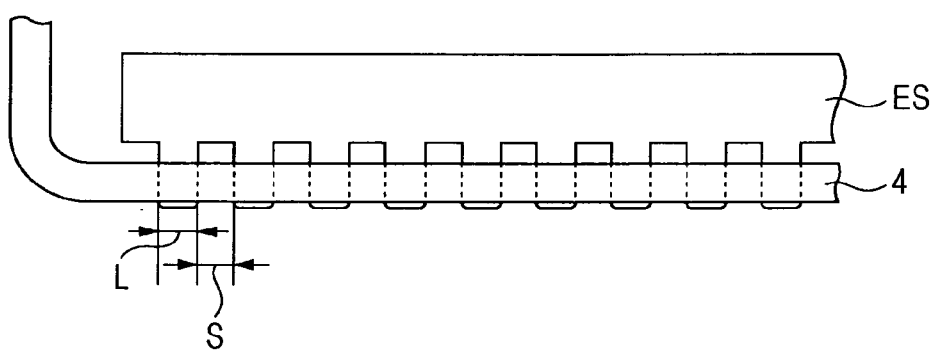
Figure 9C:
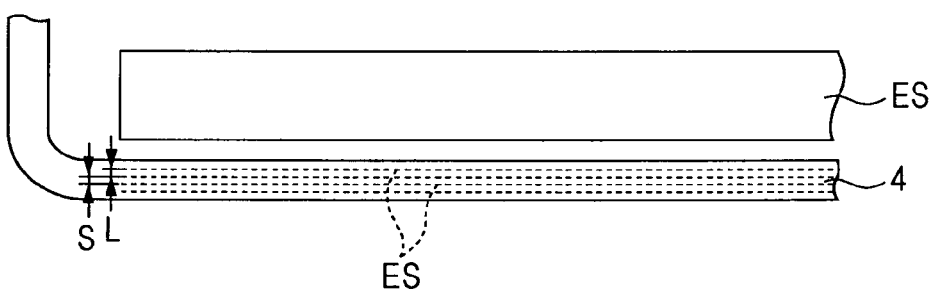
Figure 9D:
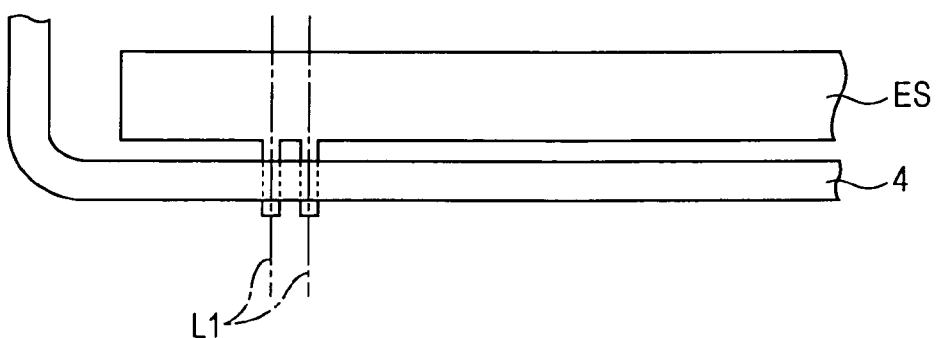

FIG. 9A to FIG. 9D show examples of formation of the shield electrode ES on the side (portion IX of FIG. 4) where the FPC 5 is provided, in the outer peripheral portion 41 of the pixel substrate 2, FIG. 9A shows an example of formation A, FIG. 9B shows an example of formation B, FIG. 9C shows an example of formation C, and FIG. 9D shows an example of formation D.

In the example of formation A, as shown in FIG. 9A, the shield electrode ES is formed at parts corresponding to the touch detection electrodes TDL, and the electrode pattern portion of the shield electrode ES formed with an electrode width W is formed to overlap with the terminal portions PAD. That is, in this example, the shield electrode ES is provided at the parts corresponding to the electrodes (in this example, the terminal portions PAD of the touch detection electrodes TDL) to which the noise is not wanted to be transmitted, to prevent the noise from being transmitted from the pixel substrate 2.

In the example of formation B, as shown in FIG. 9B, the shield electrode ES is formed to cross the area of the seal 4, and the electrode pattern portion of the shield electrode ES formed with a line width L and a space S is formed to overlap with the seal 4.

In the example of formation C, as shown in FIG. 9C, the shield electrode ES is formed along the direction of the seal 4 in the area of the seal 4, and the electrode pattern portion of the shield electrode ES formed with a line width L and a space S is formed to overlap with the seal 4.

In the example of formation D, as shown in FIG. 9D, the shield electrode ES is formed at a part corresponding to the control signal line L1 formed on the pixel substrate 2. That is, in this example, the shield electrode ES is provided at the parts corresponding to the signal lines (control signal lines L1) as the noise source to prevent the noise from being transmitted from the pixel substrate 2. In this case, it is not necessary to provide all the control signal lines L1 with the shield electrode ES. For example, it is preferable to provide the shield electrode ES only for the control signal line, the signal level of which is changed at the timing having an influence on touch detection precision, when the touch detection circuit connected to the outside detects a touch. As described above, the control signal line forming the shield electrode ES is limited, and thus it is possible to realize a layout with a higher degree of freedom.

Next, a measurement result of the amount of noise of the touch detection electrodes TDL when the shield electrode ES is formed as described in the examples of formations A to D will be described.

FIG. 10 shows the amounts of noise of the touch detection electrodes TDL in various shield electrode patterns. In the example of formation A, the measurement was performed on four patterns with different electrode widths W (widths along the directions of the seal 4) of the shield electrode ES. In the examples of formations B and C, the measurement was performed on two patterns with different line widths L and spaces S in the condition where the line width L and the space S of the shield electrode ES are the same. As reference, the measurement was performed in the case where the shield electrode ES was formed at the whole of the outer peripheral portion 41 of the pixel electrode 2 (shield electrode (whole face)) and the case where the shield electrode ES was not formed at all (no shield electrode).

As shown in FIG. 10, even in any shield electrode pattern of the examples of formations A to D, it was confirmed that the amount of noise was reduced as compared with the case where the shield electrode ES was not formed at all. Particularly, in the example of formation A, the amount of noise tends to be reduced as the electrode width W of the shield electrode ES gets wider. This means that the shield area increases as the electrode width W gets wider, and it is possible to reduce the influence of noise from the pixel substrate 2 on the terminal portions PAD of the touch detection electrodes TDL. In the example of formation B, the amount of noise is changed not so much by the line width L and the space S. The reason is because, in the example of formation B, as shown in FIG. 9B, the shield area covering the circuit or wire as the noise source of the lower portion of the shield 4 is not greatly changed even when the line width L and the space S are changed.

Predetermined stress was applied to the touch detection function display device 1 having the shield electrode pattern for which the amount of noise was measured in FIG. 10, and it was confirmed whether or not peeling occurred. The measurement was performed for each of 10 samples. As a result, when the shield electrode ES was not formed, the pealing occurred for all the 10 samples. However, in the case of having any shield electrode pattern of the examples of formations A to D, it was confirmed that the peeling did not occur at all.

As described above, in the touch detection function display device 1, for example, as shown in FIG. 8 and FIG. 9D, the shield electrode ES is selectively formed, and thus it is possible to prevent the noise from being transmitted from the pixel substrate 2 to the touch detection electrodes TDL of the opposed substrate 3 by the shield effect, at the part where the shield electrode ES is formed. Accordingly, at the part where the shield electrode ES is not formed, it is possible to secure the close adhesion between the seal 4 and the pixel substrate 2 (planarized film 23). Therefore, it is possible to suppress the deterioration of the S/N ratio of the touch detection signal Vdet to be the minimum while securing the stress resistance.

Effect

As described above, in the embodiment, since the shield electrode ES is selectively formed on the side on which the terminal portions are formed in the outer peripheral area of the pixel substrate, it is possible to suppress the deterioration of the S/N ratio of the touch detection signal Vdet to be the minimum while securing the stress resistance.

In the embodiment, since the shield electrode is formed on the same layer as the layer of the common electrode COML, it is possible to form the shield electrode without adding a new production process.

Modified Example 1

Figure 11:
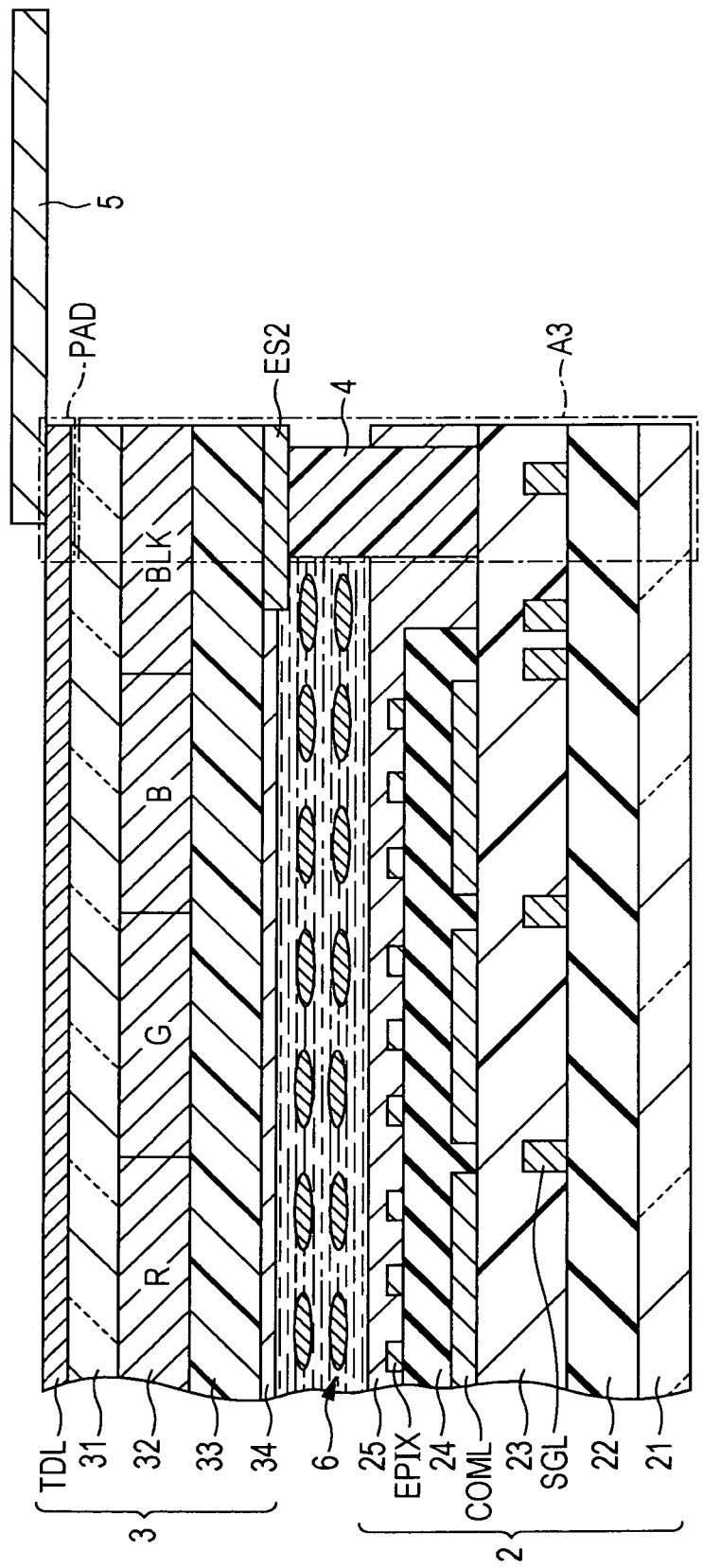
FIG. 11 is a cross-sectional view illustrating a schematic cross-sectional structure of the touch detection function display device according to a modified example.

In the above-described embodiment, the shield electrode ES is formed on the pixel substrate 2, but the present disclosure is not limited thereto. For example, the shield electrode may be formed on the opposed substrate 3 as shown in FIG. 11. In FIG. 11, the shield electrode ES2 is formed on the planarized film 33 of the opposed substrate 3. Also in this case, similarly to the above-described embodiment, the shield electrode ES is selectively formed, and thus it is possible to suppress the deterioration of the S/N ratio of the touch detection signal Vdet to be the minimum while securing the stress resistance.

Other Modified Examples

In the above-described embodiment, the shield electrode ES is formed only on the side on which the FPC 5 is formed in the outer peripheral area 41 of the pixel substrate 2, but the present disclosure is not limited thereto. For example, the shield electrode ES may be formed on the side intersecting with the side where the FPC 5 is formed. Specifically, the electrode pattern of the shield electrode ES may apply, for example, the examples of formations B to D. For example, when a gate driver for on-off control of the TFT controlling the pixel signals to be applied to the pixel electrodes EPIX is provided on the side intersecting with the side on which the FPC 5 is formed, the shield electrode ES is formed at the part corresponding to the control signal line as shown in FIG. 9D, and thus it is possible to reduce the noise transmitted from the signal line to the opposed substrate 3.

In the above-described embodiment, the shield electrode ES is formed on the same layer as the layer of the common electrode COML, but the present disclosure is not limited thereto. For example, the shield electrode may be formed on the same layer as the layer of the pixel electrode EPIX, or may be formed on the same layers as the layers of both of the common electrode COML and the pixel electrode EPIX to constitute the 2-layer shield electrode.

In the above-described embodiment, the shield electrode ES and the common electrode COML are formed of ITO, but the present disclosure is not limited thereto. For example, the shield electrode ES may be formed of any of IZO (registered trademark), zinc oxide, tin oxide, TiO, or combinations thereof.

In the above-described embodiment, the shield electrode ES is formed of ITO, but the present disclosure is not limited thereto. For example, the shield electrode ES may be formed of a material with mechanical characteristics similar to that of the material of the seal 4 or the planarized film 23. The mechanical characteristics may include, for example, the Young's modulus. For example, when the seal 4 and the planarized film 23 are formed of an organic material, the shield electrode ES may be formed of the organic material. Specifically, for example, polythiophene, polyacetylene, polyaniline, and polypyrrole may be used.

In the above-described embodiment, the planarized film 23 and the seal 4 come in close contact with each other at the part where the shield electrode ES is not provided in the outer peripheral portion 41 of the pixel substrate 2, but the surface of the planarized film 23 at this part is not limited to planarization, and may be formed of, for example, unevenness. Accordingly, the close contact area between the seal 4 and the planarized film 23 gets wider, and thus it is possible to raise the adhesion.

In the above-described embodiment, the touch detection circuit is provided outside of the touch detection function display device, but the present disclosure is not limited thereto. For example, the touch detection circuit may be provided in the touch detection function display device.

3. Application

Next, applications of the touch detection function display device described in the embodiment and modified examples will be described with reference to FIG. 12 to FIG. 16G. The touch detection function display device of the embodiment and the like may be applied to all fields of electronic apparatuses such as televisions, digital cameras, laptop personal computers, mobile terminals such as mobile phones, or video cameras. In other words, the touch detection function display device of the embodiment and the like may be applied to all fields of electronic apparatuses displaying a video signal input from the outside or a video signal generated inside as an image or a picture.

Application 1

Figure 12:
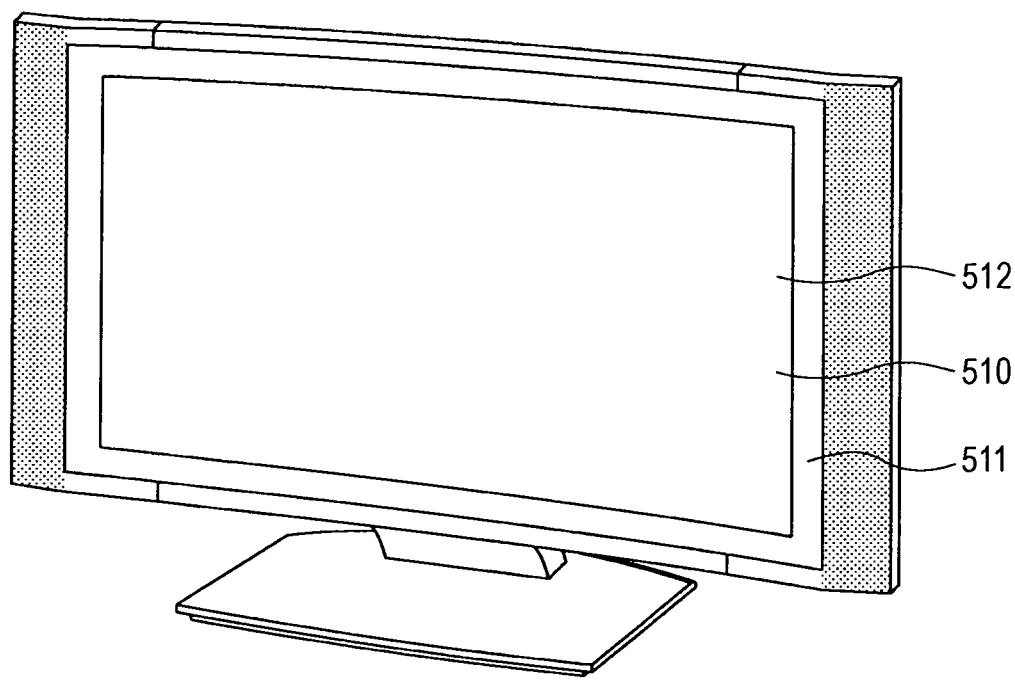
FIG. 12 is a perspective view illustrating an appearance configuration of Application 1 of the touch detection function display device according to the embodiment.

FIG. 12 shows an appearance of a television to which the touch detection function display device of the embodiment and the like is applied. For example, the television has a video display screen unit 510 including a front panel 511 and a filter glass 512, and the video display screen unit 510 is configured by the touch detection function display device according to the embodiment and the like.

Application 2

Figure 13A:
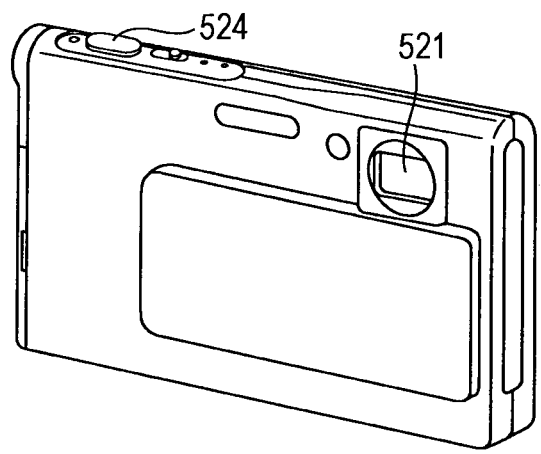
FIG. 13A and FIG. 13B are diagrams illustrating an appearance configuration of Application 2.
Figure 13B:
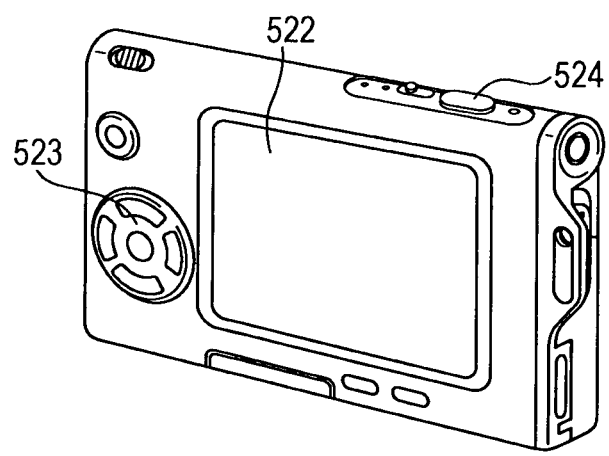

FIG. 13A and FIG. 13B show an appearance of a digital camera to which the touch detection function display device of the embodiment and the like is applied. For example, the digital camera has a flash light emitting unit 521, a display unit 522, a menu switch 523, and a shutter button 524, and the display unit 522 is configured by the touch detection function display device according to the embodiment and the like.

Application 3

Figure 14:
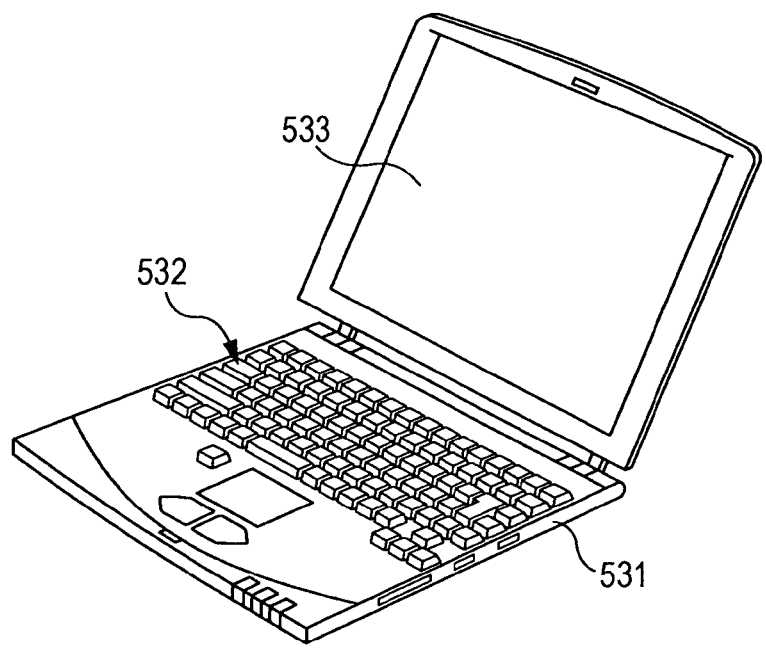
FIG. 14 is a diagram illustrating an appearance configuration of Application 3.

FIG. 14 shows an appearance of a laptop personal computer to which the touch detection function display device of the embodiment and the like is applied. For example, the laptop personal computer has a body unit 531, a keyboard 532 for an input operation of characters and the like, and a display unit 533 displaying an image, and the display unit 533 is configured by the touch detection function display device according to the embodiment and the like.

Application 4

Figure 15:
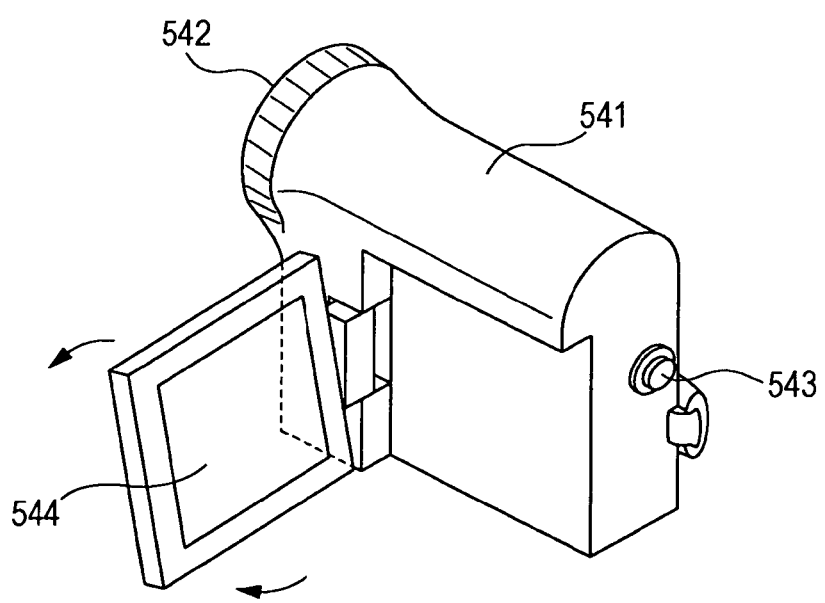
FIG. 15 is a diagram illustrating an appearance configuration of Application 4.

FIG. 15 shows an appearance of a video camera to which the touch detection function display device of the embodiment and the like is applied. For example, the video camera has a body unit 541, a lens 542 for imaging a photography subject, which is provided on the front side of the body unit 541, an imaging start/stop switch 543, and a display unit 544. The display unit 544 is configured by the touch detection function display device according to the embodiment and the like.

Application 5

FIG. 16A to FIG. 16G show an appearance of a mobile phone to which the touch detection function display device of the embodiment and the like is applied. For example, the mobile phone in which an upper case 710 and a lower case 720 are coupled by a connection portion (hinge portion) 730 has a display 740, a sub-display 750, a picture light 760, and a camera 770. The display 740 or the sub-display 750 is configured by the touch detection function display device according to the embodiment and the like.

The present disclosure has been described with reference to the embodiment, the modified examples, and the applications to the electronic apparatus, but the present disclosure is not limited to the embodiment and the like, and may be variously modified.

Figure 17:
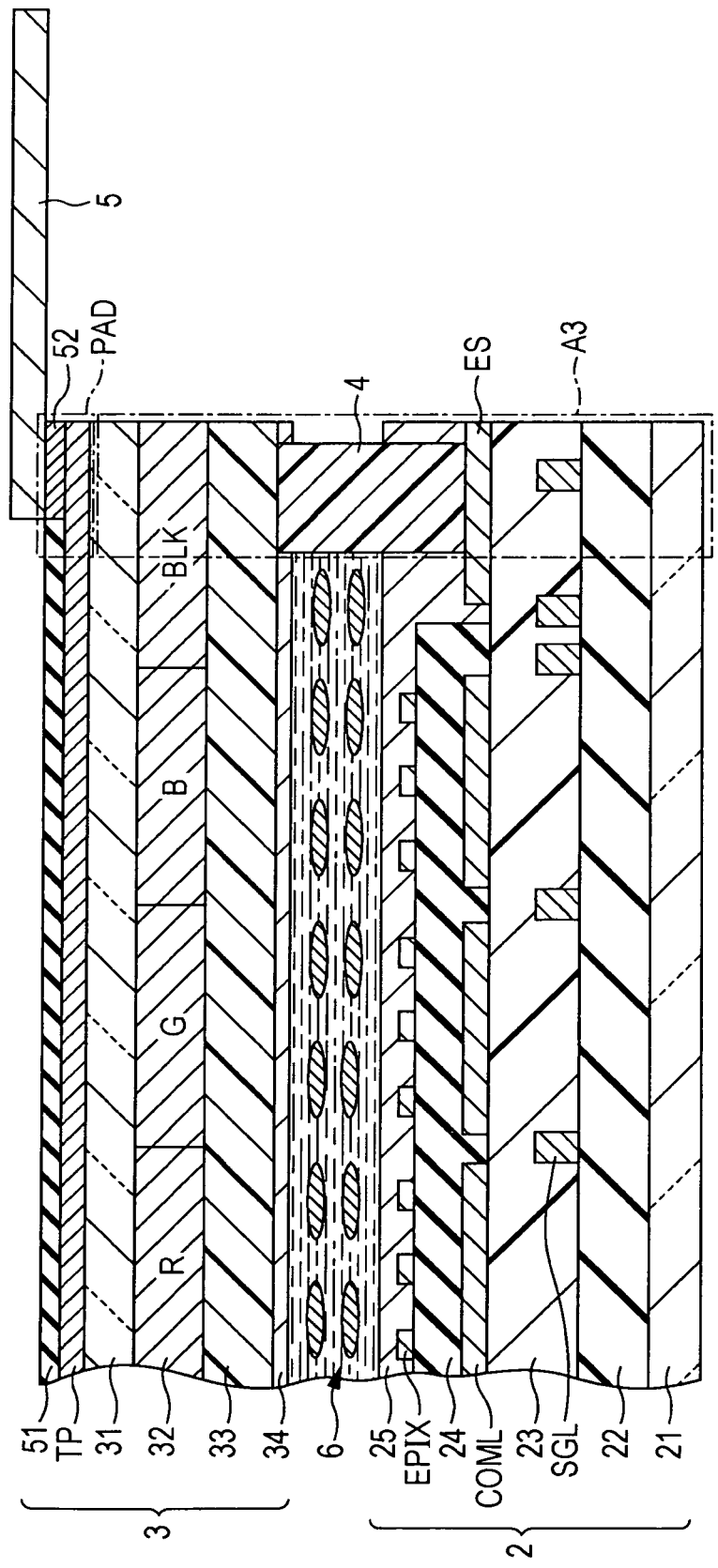
FIG. 17 is a cross-sectional view illustrating a schematic cross-sectional structure of another touch detection function display device according to a modified example.

For example, in the above-described embodiment, the liquid crystal display device and the touch detection device are integrated to be a so-called in-cell-type, but are not limited thereto. For example, as shown in FIG. 17, a so-called on-cell-type in which the touch detection device is formed on the surface of the liquid crystal display device may be used. In FIG. 17, a touch panel TP is formed on a glass substrate 31 that is the surface of the liquid crystal display device, and an insulating film 51 for protecting the surface is formed thereon. The touch panel TP is connected to the FPC 5 through an assistant wire 52.

For example, in the above-described embodiment, the liquid crystal display device using the liquid crystal of the lateral electric field mode such as FFS and IPS and the touch detection device are integrated, but a liquid crystal display device using liquid crystal of various modes such as TN (twisted nematic), VA (vertical alignment), and ECB (electrically controlled birefringence) and the touch detection device may be integrated. When such liquid crystal is used, the touch detection function display device may be configured as shown in FIG. 18. FIG. 18 shows an example of a cross-sectional structure of a main portion of the touch detection function display device according to the modified example, and shows a state where a liquid crystal layer 6B is interposed between a pixel substrate 2B and an opposed substrate 3B. Terms and functions of the other portions are the same as the case of FIG. 5, and thus the description thereof is omitted. In this example, differently from the case of FIG. 5, the common electrode COML used for both of display and touch detection is formed on the planarized film 33 of the opposed substrate 3B.

For example, in the above-described embodiment, the liquid crystal display element is used as the display element, but is not limited thereto. For example, an EL (Electro Luminescence) element may be used. Also in this case, similarly to the case (FIG. 5) of the embodiment, the shield electrode ES is selectively provided under the seal 4 for sealing the EL element, to obtain the same effect as that of the embodiment.

The present disclosure contains subject matter related to that disclosed in Japanese Priority Patent Application JP 2010-214189 filed in the Japan Patent Office on Sep. 24, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A touch detection function display device comprising:
a first substrate;
a second substrate that includes a plurality of touch detection electrodes provided in parallel and a terminal portion formed along one substrate side and connected to each of the plurality of touch detection electrodes;
a display function layer that is interposed between the first substrate and the second substrate;
a seal portion that is provided to surround the display function layer to seal the display function layer between the first substrate and the second substrate; and
a shield electrode that is provided on the first substrate, the second substrate, or both substrates along the substrate side on which the terminal portion is provided,
wherein the shield electrode includes an electrode pattern portion that is selectively formed between the first substrate, the second substrate, or both substrates, and the seal portion, and
wherein the shield electrode is formed of a material with mechanical characteristics similar to those of base portions of the first substrate and the second substrate on which the shield electrode is formed and the seal portion.

2. The touch detection function display device according to claim 1, wherein the display function layer is a liquid crystal layer.

3. The touch detection function display device according to claim 2, wherein a plurality of pixel electrodes are formed on the side of the first substrate opposed to the second substrate, and
wherein the plurality of touch detection electrodes and the terminal portion are formed on the opposite side to the side of the second substrate opposed to the first substrate.

4. The touch detection function display device according to claim 3, wherein the plurality of touch detection electrodes extend in a direction intersecting with the substrate side on which the terminal portion is provided, and
wherein a plurality of common electrodes extending in a direction intersecting with the plurality of touch detection electrodes are provided on the opposed face of the first substrate or the second substrate to the opposite substrate.

5. The touch detection function display device according to claim 1, wherein the shield electrode is formed at a part other than parts corresponding to four corners of the first substrate and the second substrate.

6. The touch detection function display device according to claim 1, wherein the electrode pattern portion is selectively formed at a position corresponding to the terminal portion.

7. The touch detection function display device according to claim 1, wherein the electrode pattern portion is selectively formed to cross the seal portion.

8. The touch detection function display device according to claim 1, wherein the electrode pattern portion is selectively formed to extend in a direction taken along the seal portion.

9. The touch detection function display device according to claim 1, wherein the first substrate has a control signal line formed to pass through a position corresponding to the seal portion, and
wherein the electrode pattern portion is selectively formed at a part corresponding to the control signal line.

10. The touch detection function display device according to claim 9, further comprising a touch detection unit that detects a touch on the basis of the touch detection signal at a touch detection period,
wherein the electrode pattern portion is selectively formed at a part corresponding to the control signal line, a signal level of which is changed during the touch detection period.

11. The touch detection function display device according to claim 1, wherein an unevenness portion is selectively formed on the surface of the first substrate, the second substrate, or both substrates, at a part where the electrode pattern portion is not formed between the first substrate, the second substrate, or both substrates, and the seal portion.

12. A touch detection function display device comprising:
a first substrate;
a second substrate that includes a plurality of touch detection electrodes provided in parallel and a terminal portion formed along one substrate side and connected to each of the plurality of touch detection electrodes;
a display function layer that is interposed between the first substrate and the second substrate;

a seal portion that is provided to surround the display function layer to seal the display function layer between the first substrate and the second substrate; and a shield electrode that is provided on the first substrate, the second substrate, or both substrates along the substrate side on which the terminal portion is provided, wherein the shield electrode includes an electrode pattern portion that is selectively formed between the first substrate, the second substrate, or both substrates, and the seal portion, wherein the display function layer is a liquid crystal layer, wherein a plurality of pixel electrodes are formed on the side of the first substrate opposed to the second substrate, wherein the plurality of touch detection electrodes and the terminal portion are formed on the opposite side to the side of the second substrate opposed to the first substrate, wherein the plurality of touch detection electrodes extend in a direction intersecting with the substrate side on which the terminal portion is provided, wherein a plurality of common electrodes extending in a direction intersecting with the plurality of touch detection electrodes are provided on the opposed face of the first substrate or the second substrate to the opposite substrate, wherein the common electrodes are formed on a layer other than the layer, on which the pixel electrodes are formed, on the face of the first substrate opposed to the second substrate, and wherein the shield electrode is formed on at least one side of the same layer as the layer on which the pixel electrodes are formed and the same layer as the layer on which the common electrodes are formed, on the first substrate.

13. A touch detection function display device comprising:
a first substrate;
a second substrate that includes a plurality of touch detection electrodes provided in parallel and a terminal portion formed along one substrate side and connected to each of the plurality of touch detection electrodes;
a display function layer that is interposed between the first substrate and the second substrate;
a seal portion that is provided to surround the display function layer to seal the display function layer between the first substrate and the second substrate; and
a shield electrode that is provided on the first substrate, the second substrate, or both substrates along the substrate side on which the terminal portion is provided, wherein the shield electrode includes an electrode pattern portion that is selectively formed between the first substrate, the second substrate, or both substrates, and the seal portion, wherein the display function layer is a liquid crystal layer, wherein a plurality of pixel electrodes are formed on the side of the first substrate opposed to the second substrate, wherein the plurality of touch detection electrodes and the terminal portion are formed on the opposite side to the side of the second substrate opposed to the first substrate, wherein the plurality of touch detection electrodes extend in a direction intersecting with the substrate side on which the terminal portion is provided, wherein a plurality of common electrodes extending in a direction intersecting with the plurality of touch detection electrodes are provided on the opposed face of the first substrate or the second substrate to the opposite substrate, wherein the common electrodes are formed on the face of the second substrate opposed to the first substrate, and wherein the shield electrode is formed on at least one side of the same layer as the layer on which the pixel electrodes are formed on the first substrate and the same layer as the layer on which the common electrodes are formed on the second substrate.

14. The touch detection function display device according to claim 1, wherein the mechanical characteristics includes at least a Young's modulus.

15. The touch detection function display device according to claim 1, wherein the shield electrode, the base portion, and the seal portion are formed of an organic material.

16. The touch detection function display device according to claim 1, wherein the shield electrode is also formed on the side intersecting with the substrate side.

17. The touch detection function display device according to claim 1, wherein a fixed potential is applied to the shield electrode.

* * * * *